(12) United States Patent
Ota

(10) Patent No.: US 10,992,639 B2
(45) Date of Patent: Apr. 27, 2021

(54) INFORMATION PROCESSING APPARATUS AND PACKET RELAY METHOD

(71) Applicant: Hiroshi Ota, Tokyo (JP)

(72) Inventor: Hiroshi Ota, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/357,540

(22) Filed: Mar. 19, 2019

(65) Prior Publication Data

US 2019/0306113 A1    Oct. 3, 2019

(30) Foreign Application Priority Data

Mar. 28, 2018    (JP) .............................. JP2018-063017

(51) Int. Cl.
*H04L 29/12*        (2006.01)

(52) U.S. Cl.
CPC ........ *H04L 61/2589* (2013.01); *H04L 61/103* (2013.01); *H04L 61/2015* (2013.01); *H04L 61/255* (2013.01); *H04L 61/2517* (2013.01); *H04L 61/2507* (2013.01)

(58) Field of Classification Search
None
See application file for complete search history.

(56) References Cited

U.S. PATENT DOCUMENTS 7,480,710 B1 * 1/2009 Olson ............... H04L 29/12264
709/223

2002/0062485 A1 * 5/2002 Okano ................ H04L 29/1282
725/111
2006/0047853 A1 * 3/2006 Igarashi ............ H04L 29/12028
709/245

(Continued)

FOREIGN PATENT DOCUMENTS

| EP | 3223498 A1 | 9/2017 |
|---|---|---|
| JP | 2004-180211 | 6/2004 |
| JP | 2017-200178 | 11/2017 |

OTHER PUBLICATIONS

U.S. Appl. No. 16/085,058, filed Apr. 19, 2017, Yoshitaka Komine.
Extended European Search Report dated Jul. 4, 2019.

*Primary Examiner* — Mohamed Ibrahim
(74) *Attorney, Agent, or Firm* — Harness, Dickey & Pierce, P.L.C.

(57) ABSTRACT

An information processing apparatus includes a memory configured to store a plurality of instructions which causes one or more processors to: store, in the memory, a first IP address dynamically assigned to a first device and store a second IP address, which is for communicating with the first device and is in accordance with an address architecture of a second network segment; receive a packet transmitted from the second network segment and addressed to the second IP address; convert a destination IP address of the received packet from the second IP address into the first IP address; convert a transmission source IP address of the received packet into an IP address assigned as an own IP address in accordance with an address architecture of a first network segment; and transmit, to the first device, the packet having the converted destination IP address and transmission source IP address.

7 Claims, 19 Drawing Sheets

(56) References Cited

U.S. PATENT DOCUMENTS

| | | | |
|---|---|---|---|
| 2008/0025331 A1* | 1/2008 | Tabata | H04L 12/4633 370/409 |
| 2013/0058256 A1 | 3/2013 | Li et al. | |
| 2013/0097335 A1* | 4/2013 | Jiang | H04L 61/2528 709/245 |
| 2014/0075010 A1* | 3/2014 | Gupta | H04N 1/32789 709/224 |
| 2015/0222784 A1* | 8/2015 | Ando | H04N 1/00214 358/1.15 |
| 2017/0188399 A1* | 6/2017 | Nagano | H04L 61/2015 |
| 2018/0026939 A1 | 1/2018 | Nagamine | |

* cited by examiner

FIG. 2

| DEVICE | Network address/netmask | DESCRIPTION |
|---|---|---|
| Net_A | 192.168.1.0/24 | |
| Net_B | 172.16.1.0/24 | |
| Net_C | 10.0.1.0/24 | |
| Net_I | 203.0.113.0/29 | SEGMENT FOR ENTERING THE INTERNET |

FIG. 3

| DEVICE | IPaddress /subnetmask | default gateway | DESCRIPTION |
|---|---|---|---|
| MFP | Auto | Auto | |
| Box | Auto<br>Auto<br>Auto | Auto<br>Auto<br>Auto | TRANSMITTING/RECEIVING UNIT A<br>TRANSMITTING/RECEIVING UNIT B<br>TRANSMITTING/RECEIVING UNIT C |
| R_A | 192.168.1.1/24<br>192.168.10.1/24 | – | ROUTER |
| DHCP_S_A | 192.168.1.2/24 | 192.168.1.1 | |
| PC_A | Auto | Auto | |
| R_B | 172.16.1.1/24<br>172.16.10.1/24 | – | ROUTER |
| DHCP_S_B | 172.16.1.2 | 172.16.1.1 | |
| SMB_S_B | 172.16.1.5 | | |
| PC_B | Auto | Auto | |
| R_C | 10.0.1.1/24<br>10.0.10.1/24<br>203.0.113.2/29 | 203.0.113.1/29 | ROUTER CAPABLE OF TRANSMITTING PACKETS TO THE INTERNET |
| PC_C | 10.0.1.6/24 | 10.0.1.1 | |
| SMB_S_C | 10.0.1.5/24 | | |

FIG. 4

| DEVICE | Network address range | DESCRIPTION |
|---|---|---|
| DHCP_S_A | 192.168.1.6-192.168.1.20 | |
| DHCP_S_B | 172.16.1.6-172.16.1.20 | |

INFORMATION PROCESSING APPARATUS AND PACKET RELAY METHOD

CROSS-REFERENCE TO RELATED APPLICATION

This patent application is based on and claims priority pursuant to 35 U.S.C. § 119(a) to Japanese Patent Application No. 2018-063017, filed on Mar. 28, 2018, in the Japan Patent Office, the entire disclosure of which is hereby incorporated by reference herein.

BACKGROUND

Technical Field

The present disclosure relates to an information processing apparatus and a packet relay method.

Description of the Related Art

System are now in widespread use in which networks are divided and a plurality of network segments (broadcast domains) are provided for information protection or the like. In addition, it is general operation that a Dynamic Host Configuration Protocol (DHCP) server automatically configures network setting such as an Internet Protocol (IP) address and centrally manages the network setting rather than configuring the network setting individually with a personal computer (hereinafter referred to as a "PC").

To ensure security of communication between an information device such as a printer or a server and a plurality of network segments (hereinafter sometimes referred to as segments), a conventional network device that relays the communication pre-registers an IP address of the information device in the network device itself and controls an access by using the pre-registered IP address. Therefore, when the IP address of the information device dynamically changes, there is a need to change information registered in the network device accordingly.

In view of the above-described issue, an information device such as a printer or a server often uses a fixed IP address. However, there is also a demand that the DHCP centrally manages the network setting of the information device.

SUMMARY

According to an embodiment, an information processing apparatus relays a packet between a first network segment and a second network segment, which is a segment different from the first network segment. The information processing apparatus includes a memory configured to store a plurality of instructions which, when executed by one or more processors, cause the one or more processors to: store, in the memory, a first IP address dynamically assigned to a first device provided in the first network segment and store a second IP address, which is for communicating with the first device and is in accordance with an address architecture of the second network segment; receive a packet that is transmitted from the second network segment and addressed to the second IP address; convert a destination IP address of the packet received by the one or more processors from the second IP address into the first IP address stored in the memory; convert a transmission source IP address of the packet received by the one or more processors into an IP address assigned as an own IP address in accordance with an address architecture of the first network segment; and transmit, to the first device, the packet having the destination IP address and the transmission source IP address each of which is converted by the one or more processors.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a diagram illustrating an example of an address architecture of each network, according to an embodiment of the present disclosure;

FIG. 3 is a diagram illustrating a network setting example of each of devices illustrated in FIG. 1;

FIG. 4 is a diagram illustrating an example of an address assignment range of a DHCP server, according to an embodiment of the present disclosure;

Figure 1:
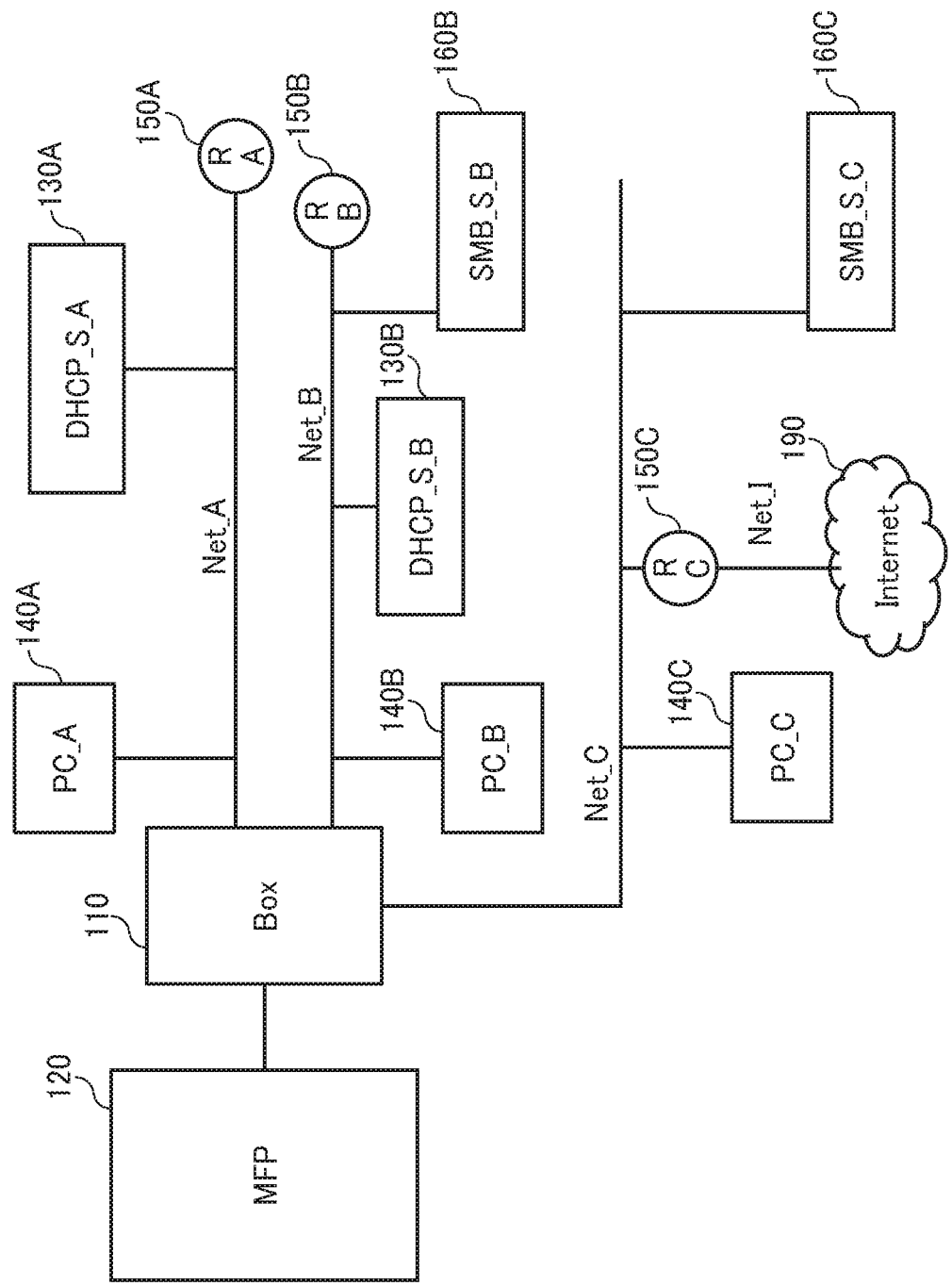
FIG. 1 is a diagram illustrating a configuration of an entire system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As a related technique, a system is known in which a proxy network control apparatus provided between an information device and a DHCP server. This proxy network control apparatus performs access control on the information device to which an address has been issued based on a DHCP communication packet between the information device and a DHCP server apparatus.

In this related technique, access control only in a case where a user terminal and a DHCP server are contained in one network segment is addressed, and access control for an information device (for example, printers) from a plurality of network segments is not addressed.

In the present embodiment, a DHCP server is provided, and an IP address is assigned to an information device (for example, an MFP described later) by using a DHCP protocol. In the present embodiment, a network device (information processing apparatus) is provided between the information device and the DHCP server. The network device acquires a packet of a communication performed between the information device and the DHCP server and registers, in the network device itself, an address for the information device assigned by the DHCP server. In the present embodiment, packets are transferred by using this registered content. This enables communication between an information device whose IP address is dynamically assigned by the DHCP and a device that cannot directly communicate with this IP address.

Hereinafter, an information processing apparatus and a packet relay method of the present embodiment will be described in detail with reference to the drawings.

FIG. 1 is a diagram illustrating a configuration of an entire system. An MFP 120 is a multifunction peripheral having multiple functions such as copying, printing, and scanning. An interface box 110 (represented by "Box" in the figures) is the network device. The interface box 110 relays packets between a network segment A (referred to as "Net_A") and a network segment B (referred to as "Net_B"), and a network segment C (referred to as "Net_C"), each of which is a segment different from the Net_A.

In the Net_A, a DHCP server 130A (represented by "DHCP_S_A" in the figures) and a PC 140A (represented by "PC_A" in the figures), which is a personal computer, and a router 150A (represented by "R_A" in the figures) are provided. The router 150A is used as a default gateway from the network of the Net_A and is connected to other networks.

In the Net_B, a DHCP server 130B (represented by "DHCP_S_B" in the figures), a PC 140B (represented by "PC_B" in the figures), a file server 160B (represented by "SMB_S_B" in the figures), and a router 150B (represented by "R_B" in the figures) are provided.

In the Net_C, a PC 140C (represented by "PC_C" in the figures), a file server 160C (represented by "SMB_S_C" in the figures), and a router 150C (represented by "R_C" in the figures) are provided which are connected to the Internet (represented by "Net_I" in the figures) via the router 150C. In addition, in an example of FIG. 1, there is no DHCP server in the Net_C.

The Net_A, Net_B and Net_C are different network segments (broadcast domains), respectively, and a degree of security is in a relation such that (Net_A)>(Net_B)>(Net_C). That is, the Net_A is the most secure network segment with few attacks by viruses and third parties.

For an access from the Net_A to the MFP 120, the interface box 110 directly transfers a payload part by using a Media Access Control (MAC) address. In addition, for an access from the MFP 120 to the Net_A, the interface box 110 directly transfers a payload part by using the MAC address. The direct transfer using this MAC address is called a bridge transfer, and the Net_A is called a bridge segment.

Meanwhile, each of the Net_B and Net_C is referred to as a "packet transfer segment" because the interface box 110 performs network address port translation (NAPT).

From the bridge segment, basically all functions of the MFP 120 can be used, while a part of the functions of the MFP 120 can be used from the packet transfer segments.

FIG. 2 is a diagram illustrating an example of an address architecture of each network segment. As illustrated in FIG. 2, the Net_A, Net_B, and Net_C are all private networks and are not directly connected to the Internet. The Net_I is a network segment for sending packets to the Internet. In addition, the Net_A, Net_B, and Net_C are segments that each contains about 250 devices, for example.

FIG. 3 is a diagram illustrating a network setting example of each of the devices illustrated in FIG. 1. The "Auto" illustrated in FIG. 3 is a setting value for distributing by the DHCP a network setting such as an address, a subnet mask, a default gateway and the like. As illustrated in FIG. 3, for a PC in each segment of the MFP 120, the interface box 110, the Net_A, and the Net_B, a network setting is distributed by the DHCP in order to reduce an operation load. Distributing a network setting by the DHCP makes it possible to manage the network setting on a DHCP server side without setting an IP address individually for each device. Although in the present embodiment, the DHCP server can dynamically change the IP address, the DHCP server also includes a function for fixing a network setting for a MAC address assigned to a device. This function enables operation in which the network setting of the device is fixed. Since there is no DHCP server in the Net_C, IP addresses are manually assigned to the PC 140C and the file server 160C, respectively.

FIG. 4 is a diagram illustrating an example of an address assignment range of a DHCP server 130A and a DHCP server 130B. From the DHCP server 130A and the DHCP server 130B, IP addresses in the range illustrated in FIG. 4 are assigned. IP addresses outside the range illustrated in FIG. 4 can be set by a method other than the DHCP. So far, while a network configuration by a DHCP in IPv4 has been illustrated, the DHCP can be used similarly in a case of IPv6 as well.

The DHCP server 130A installed in the Net_A segment assigns an address in a range defined as the Net_A segment. Similarly, the DHCP server 130B installed in the Net_B segment also assigns an address in a range defined as the Net_B segment. As described above, the range of addresses assigned by the DHCP server 130A and the DHCP server 130B is in accordance with the address architecture illustrated in FIG. 2, and the range is defined in both sides in such a manner that the DHCP server 130A and the DHCP server 130B do not assign a same IP address. In the present embodiment, it is assumed that communication cannot be performed between a bridge segment and a packet transfer segment, and there is no need for the DHCP servers to be aware of each other. Therefore, the IP addresses of both the DIRT server 130A and the DHCP server 130B may be the same.

Figure 5:
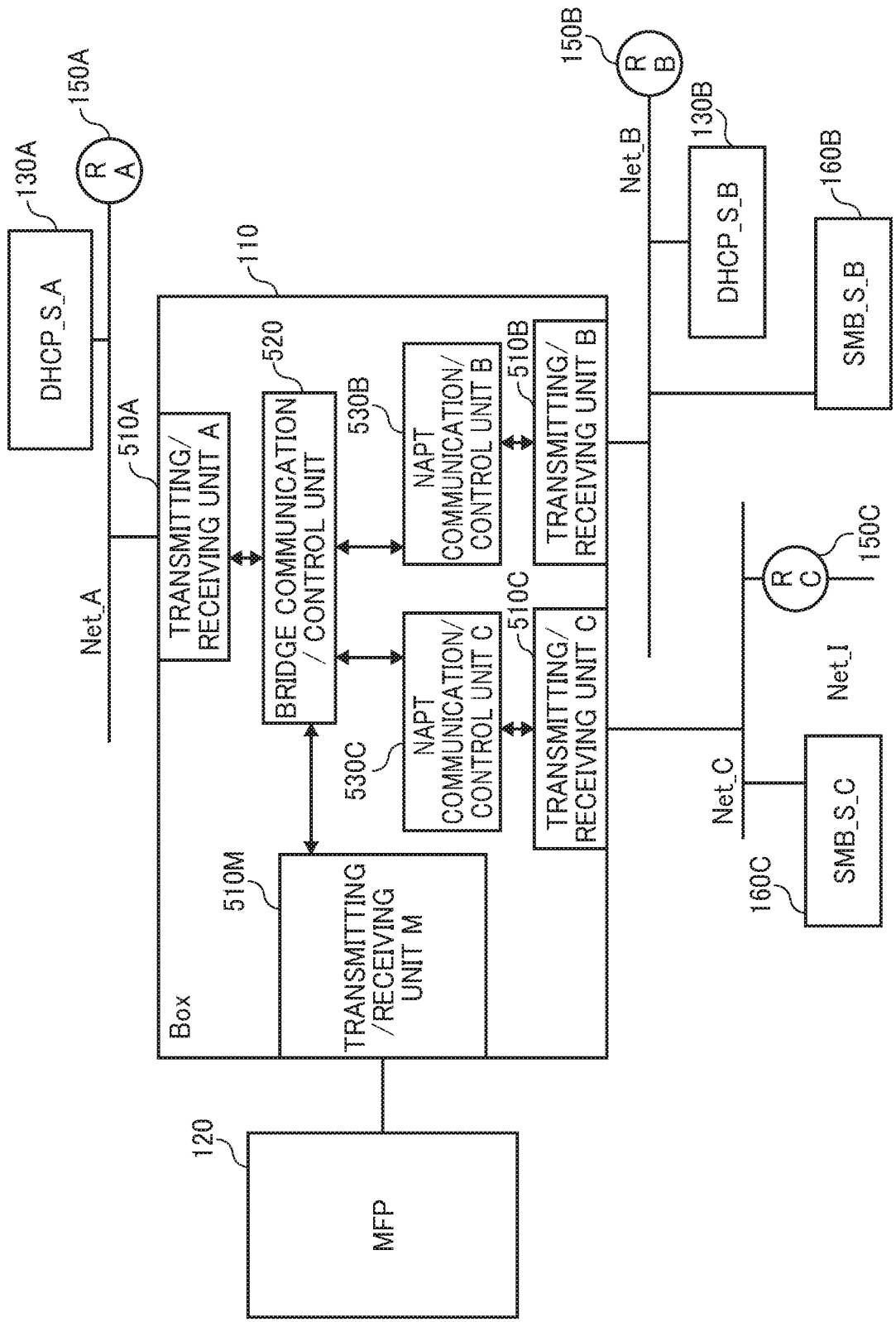
FIG. 5 is a diagram illustrating an example of an internal configuration of an interface box and a connection relationship with other devices, according to an embodiment of the present disclosure.

FIG. 5 is a diagram illustrating an example of an internal configuration of the interface box 110 and a peripheral connection relationship. The interface box 110 includes a bridge communication/control unit 520, NAPT communication/control units 530B and 530C, and transmitting/receiving units 510A, 510B, 510C, and 510M.

The transmitting/receiving units 510A, 510B, 510C, and 510M each include a port connected to a connector of a LAN cable. The transmitting/receiving units 510A, 510B, 510C, and 510M are respectively connected to the Net_A, Net_B, Net_C and the MFP 120, and control communication at a first layer (physical layer) of an Open Systems Interconnection (OSI) reference model.

The bridge communication/control unit 520 mainly controls communication at a second layer (data link layer) of the OSI reference model, refers a transmission destination MAC address of a flowing data link, and transfers the address to a port (transmitting/receiving unit) mapped by a MAC address table held by the bridge communication/control unit 520.

The NAPT communication/control unit 530B performs address translation in order to transfer an IP packet from the segment of the Net_B to the 120 and to transfer the IP packet from the MFP 120 to the segment of the Net_B. The NAPT communication/control unit 530B converts the IP address into an own IP address of the NAPT communication/control unit 530B, converts a TCP or UDP port number into a number specified by the NAPT communication/control unit 530B itself, and transmits the number. At a time of this transmission, the NAPT communication/control unit 530B maps and temporarily stores information on which IP address and which port number have been converted into which IP address and which port number. Then, upon receiving a reply packet, the NAPT communication/control unit 530B restores an original IP address and an original port number and transfers the reply packet. In the present embodiment, it is assumed that the Net_A, Net_B, and Net_C are separated and that they cannot communicate with each other. In another example, the Net_A, Net_B, and Net_C are not be separated.

The NAPT communication/control unit 530C includes a same function as that of the NAPT communication/control unit 530B, except that address translation regarding the segment of the Net_C is performed.

Detailed configurations of the bridge communication/control unit 520 and the NAPT communication/control units 530B and 530C will be described later.

The Net_A is a bridge segment and is bridge-connected to the MFP 120. Therefore, the MFP 120 communicates with the DHCP server 130A in the Net_A to configure a setting relating to a network, such as an address, a subnet mask, a default gateway, and the like by using a DHCP mechanism. Since the DHCP communication from the MFP 120 passes through the interface box 110, the interface box 110 receives and analyzes the DHCP communication so as to detect what kind of setting is assigned to the MFP 120.

In addition, since the Net_B communicates with the MFP 120 through NAPT communication, the DHCP server 130B in the Net_B does not assign information such as an IP address to the MFP 120. However, although in the embodiment, the DHCP server 130A of the Net_A is used, this is just an example. If the interface box 110 allows communication with the DHCP server 130B of the Net_B to pass the interface box 110, the MFP 120 can set up the network by using the MKT server 130B.

In addition, the interface box 110 itself also receives the network setting relating to the Net_A from the DHCP server 130A and the network setting relating to the Net_B from the DHCP server 130B, and performs network setting by using values of the network setting received from the DHCP server 130A and the DHCP server 130B.

Figure 6:
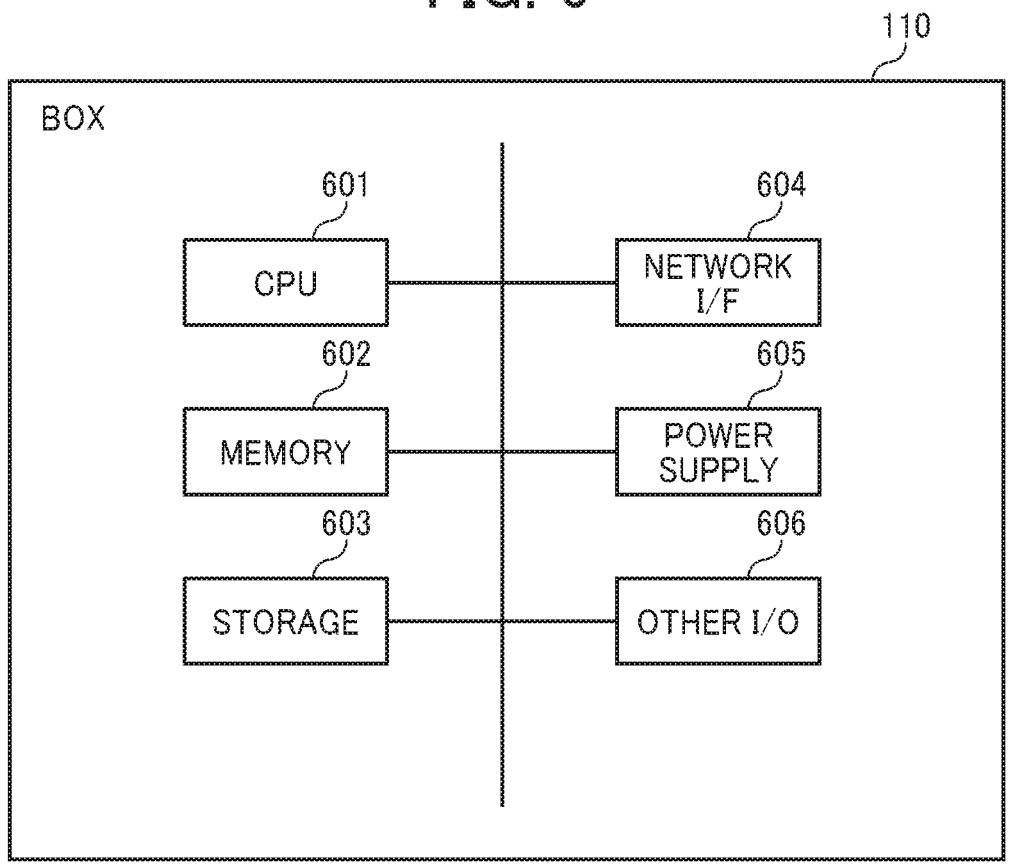
FIG. 6 is a diagram illustrating an example of a hardware configuration of the interface box, according to an embodiment of the present disclosure.

FIG. 6 is a diagram illustrating an example of a hardware configuration of the interface box 110. The interface box 110 includes a Central Processing Unit (CPU) 601, a memory 602, a storage 603, a network Interface (I/F) 604, a power supply 605, and an Input/Output (I/O) 206.

The CPU 601 is an arithmetic processing device and executes a program stored in a storage 203, thereby cooperating with each hardware in the interface box 110 to build each unit illustrated in the abovementioned FIG. 5.

The memory 602 is a main storage device for providing a temporary storage area for the CPU 601 to perform each processing. The main storage device is volatile, and when the power supply 605 is turned off, the data stored in the memory 602 is lost.

The storage 603 is a nonvolatile storage device that stores data that is desired to be stored even when the power supply is turned off. Generally, the storage 203 is an EEPROM or a flash memory, but may be a hard disk drive or a solid state drive (SSD).

A network I/F 204 includes a LAN port terminal for connecting to each segment, and is a physical communication interface for communicating with each device. Although wired communication using cables is used in the present embodiment, wireless communication may be performed in another example.

The power supply 605 is a power source for driving a board in the interface box 110, and supplies commercial power to an inside of the device by using an AC adapter or the like.

The other I/O includes terminals for connecting cables conforming to the Recommended Standard (RS)-232 standard and universal serial bus (USB) standard, for example, and is assumed to be various input/output interfaces for directly communicating with other terminal devices.

While the interface box 110 is implemented by a computer as illustrated in FIG. 6, the interface box 110 is not limited to this configuration and may have a configuration in which a part or all of arithmetic processing units may be implemented by an integrated circuit such as an application specific integrated circuit (ASIC). A configuration including such an integrated circuit can also be regarded as one aspect of a computer.

Figure 7:
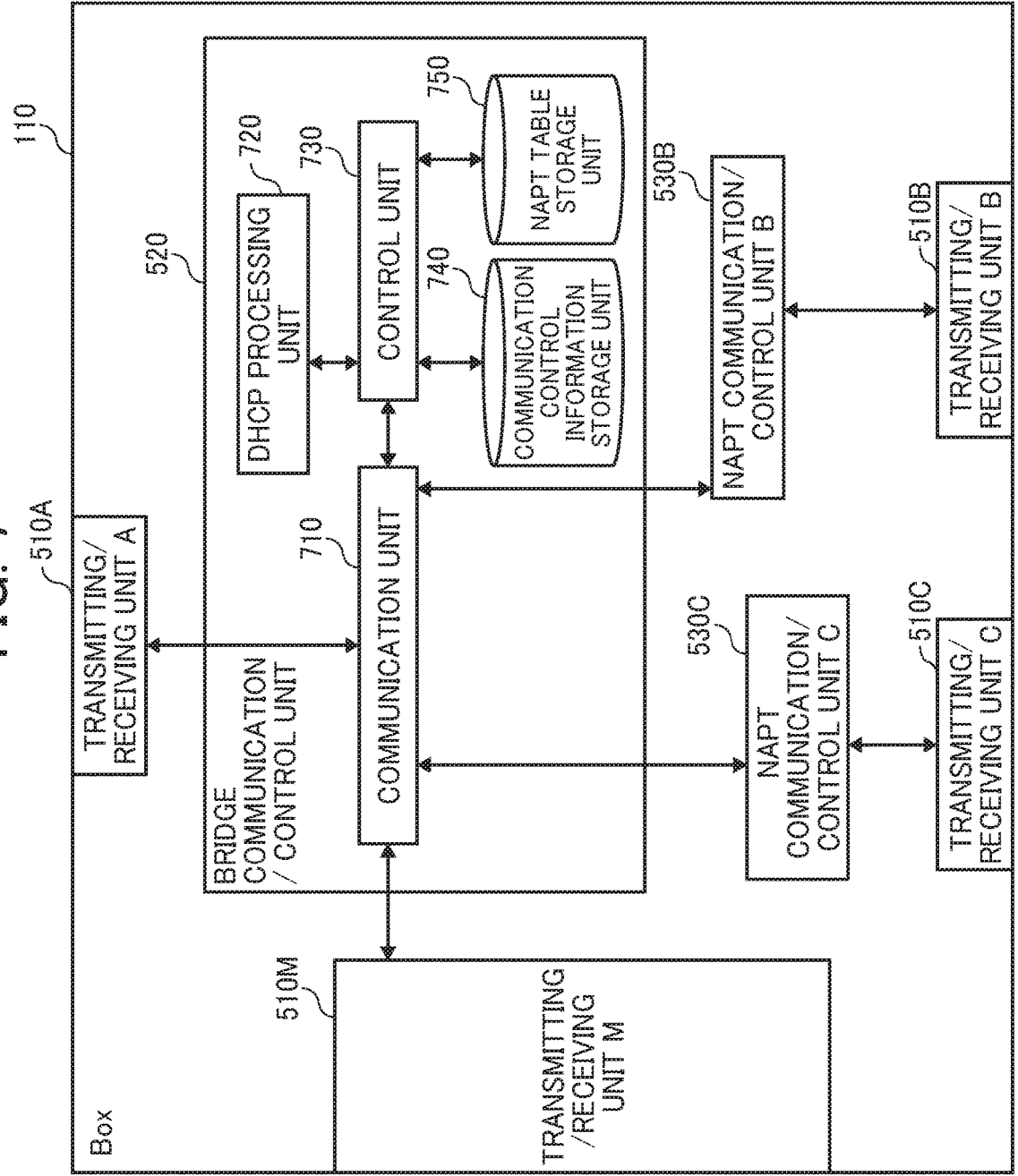
FIG. 7 is a diagram illustrating an example of a detailed configuration of a bridge communication/control unit, according to an embodiment of the present disclosure.

FIG. 7 is a diagram illustrating an example of a detailed configuration of the bridge communication/control unit 520. A control unit 730 comprehensively controls each unit in the bridge communication/control unit 520, and is responsible for passing data between each unit. A communication unit 710 transfers data between the transmitting/receiving unit 510A and the transmitting/receiving unit 510M by using the MAC address. In addition, the communication unit 710 is configured to be capable of communicating with the NAPT communication/control units 530B and 530C, and also transfers data transmitted from each of these units.

The DHCP processing unit 720 snoops a packet being transferred, and when the packet is a DHCP packet, further analyzes content of the packet, grasps a communication state of the DHCP, and detects content of network setting. After analyzing this DHCP packet and detecting the content of network setting, network setting information of the MFP 120 is stored in the communication control information storage unit 740. The communication unit 710 carries out access control between the MFP 120 and the Net_A, Net_B, and Net_C based on the stored information.

In addition to the above, when receiving communication (Request For Comments (RFC)3927) of Address Resolution Protocol (ARP) by AutoNet from the MFP 120 or when receiving communication (RFC4861) of IPv6 neighbor discovery, the DHCP processing unit 720 stores in the communication control information storage unit 740 the network setting information of the MFP 120 with the device of the transmission source being the MFP 120. The communication unit 710 can also carry out access control based on the information acquired in this way.

A NAPT table storage unit 750 will be described. In the present embodiment, an internal local segment for communicating between each unit of the bridge communication/control unit 520 the NAPT communication/control unit 530B, and the NAPT communication/control unit 530C is provided in advance (a specific example will be described in a first application example described later). That is, the communication between the Net_A and the MFP 120 is a bridge transfer as described above, but the communication between the Net_A and Net_B, and Net_C is a transfer involving address translation because the communication passes through the internal local segment. The NAPT table storage unit 750 stores an address mapping table between the internal local segment and the Net_A segment. This address mapping table is a table in which IP addresses and port numbers between respective segments are mapped with each other as before.

Figure 8:
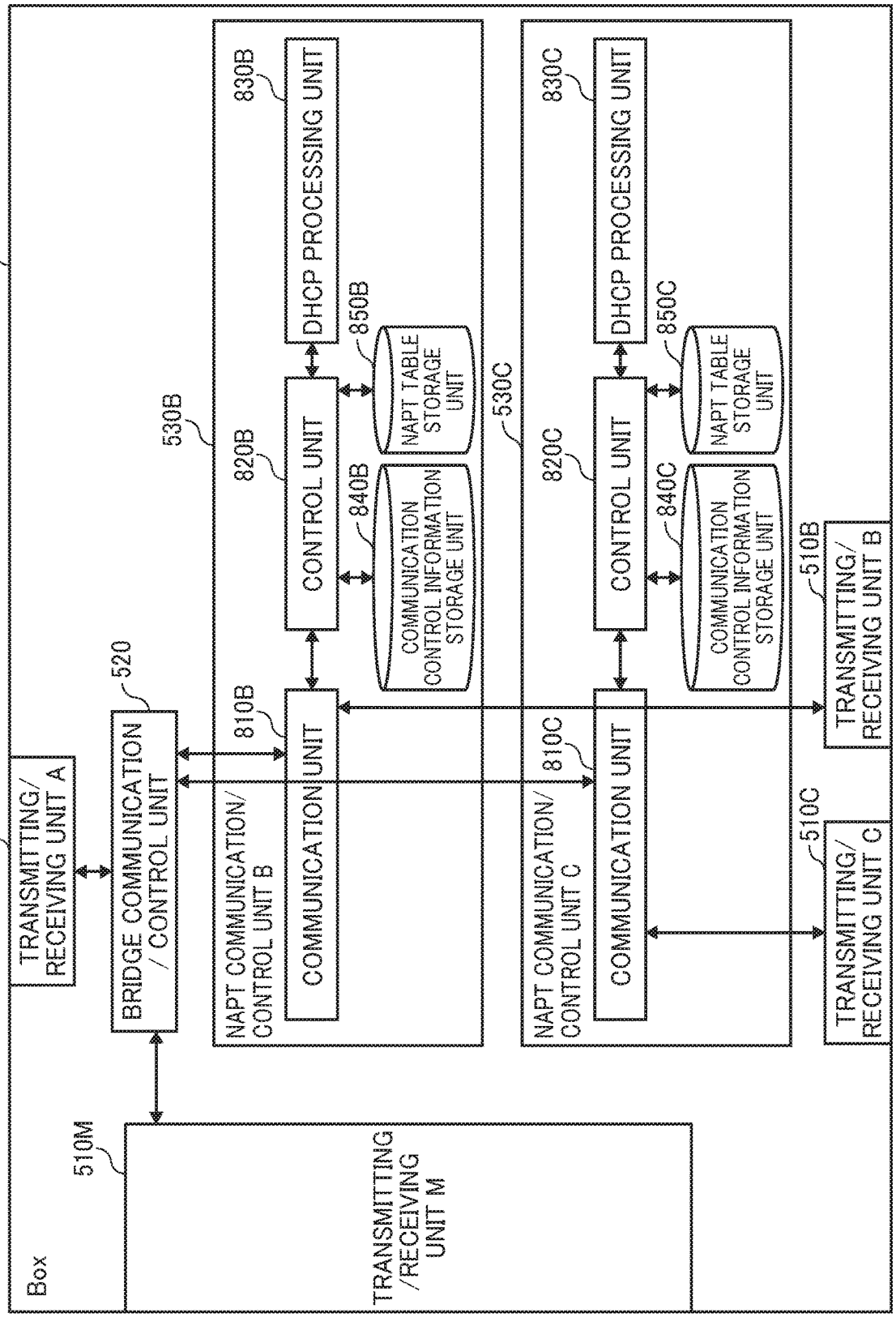
FIG. 8 is a diagram illustrating an example of a detailed configuration of a Network Address Port Translation (NAPT) communication/control unit, according to an embodiment of the present disclosure.

FIG. 8 is a diagram illustrating an example of a detailed configuration of the NAPT communication/control units 530B and 530C. Although the description is given hereinafter of the NAPT communication/control unit 530B, the same applies to the NAPT communication/control unit 530C.

A control unit 820B comprehensively controls each unit in the NAPT communication/control unit 530B, and is responsible for passing data between each unit. A communication unit 810B controls data transfer between the bridge communication/control unit 520 and the transmitting/receiving unit 510B.

A DHCP processing unit 830B is the same as the DHCP processing unit 720 described with reference to the above-mentioned FIG. 7. Suppose when the IP address of the MFP 120 is assigned from the DHCP server 130B provided in the Net_B segment, the DHCP processing unit 830B analyzes the DHCP packet and stores the network setting information of the MFP 120 in a communication control information storage unit 840B. A NAPT table storage unit 850B stores an address mapping table between the internal local segment and the Net_B segment.

Figure 9:
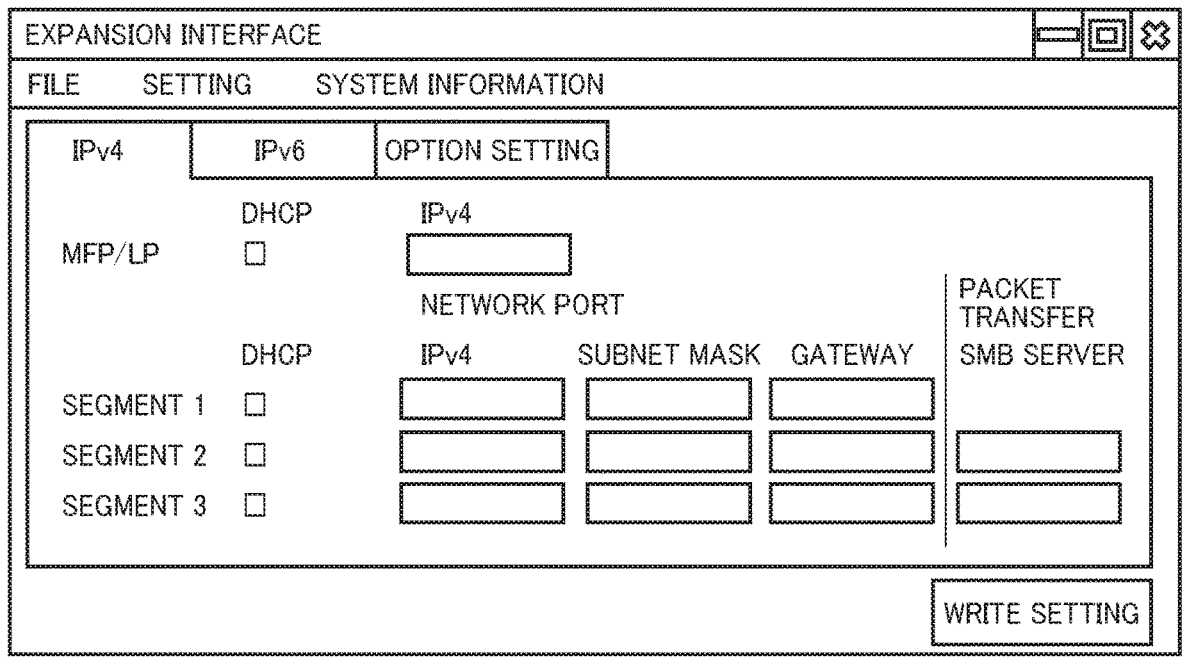
FIG. 9 is a diagram illustrating an example of a setting screen of the interface box, according to an embodiment of the present disclosure.

FIG. 9 is a diagram illustrating an example of a setting screen of the interface box 110. As in the example of FIG. 9, there is a check box to check whether to use the DHCP for each segment in the setting screen, and a user can decide whether to use the DHCP via this setting screen. In this case, a segment 1 is a bridge segment (Net_A), and a segment 2 and a segment 3 are packet transfer segments (Net_B and Net_C). As a matter of course, the bridge segment may be the segment 2 or segment 3, but for the sake of simplicity of explanation, it is assumed that the bridge segment is fixed to the segment 1.

Figure 10:
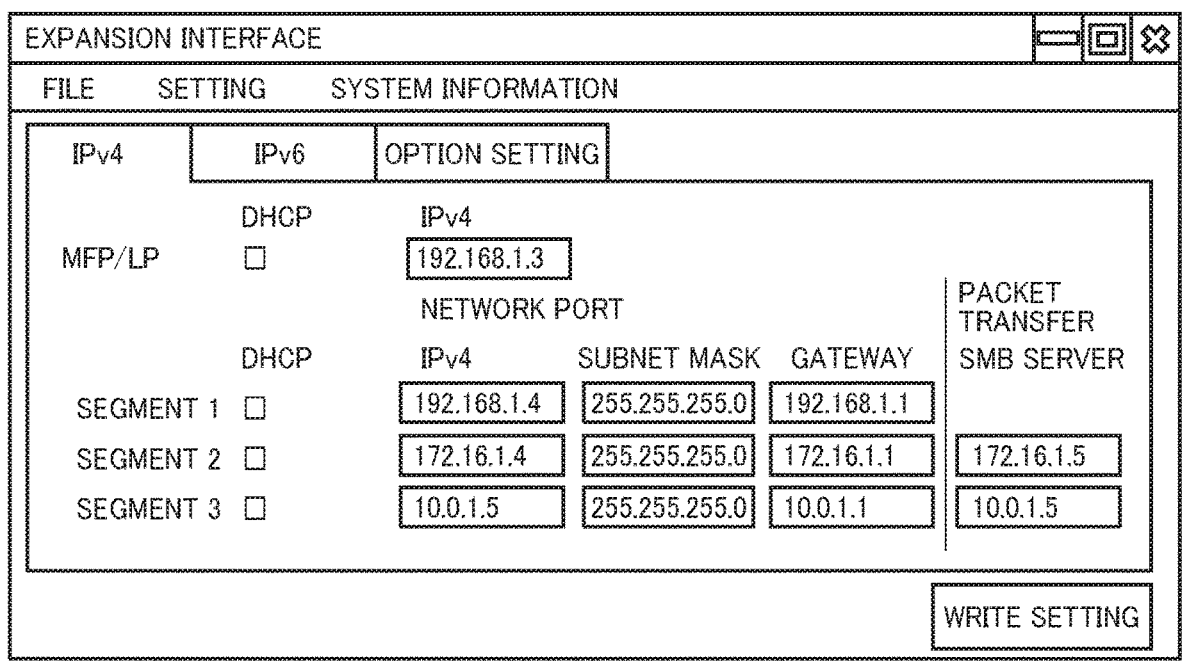
FIG. 10 is a diagram illustrating a setting example when DHCP is not used.

FIG. 10 illustrates a setting example when the DHCP is not used. When the DHCP is not used, there is a need to manually input all addresses of an interface of the MFP 120 and each segment, which complicates the operation.

Figure 11:
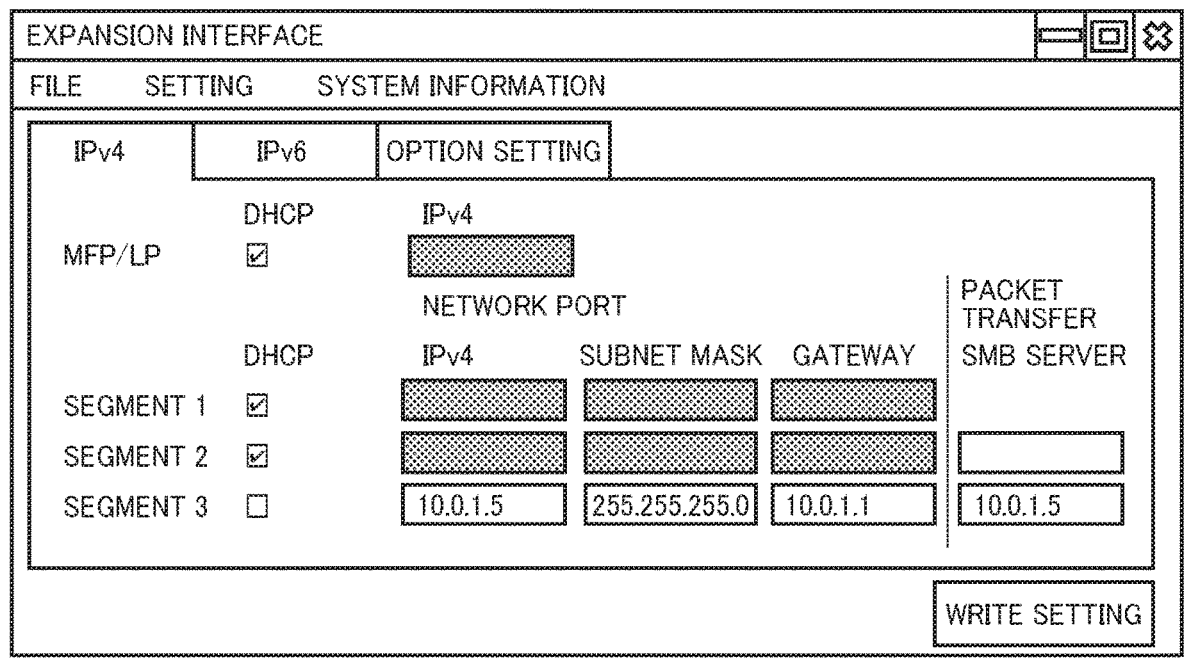
FIG. 11 is a diagram illustrating a setting example when DHCP is used, according to an embodiment of the present disclosure.

FIG. 11 illustrates a setting example when the DHCP is used. When the DHCP is used, a fixed IP address or the like is specified only for the Net_C (segment 3) having no DHCP server, and there is no need to set other addresses, subnet mask, default gateway. Therefore, the operation is simplified, and the operation load is reduced. As a matter of course, it is possible to install a DHCP server in the Net_C as well, and in that case, putting a mark in a check box of the DHCP eliminates a need to manually configure a network.

Figure 12:
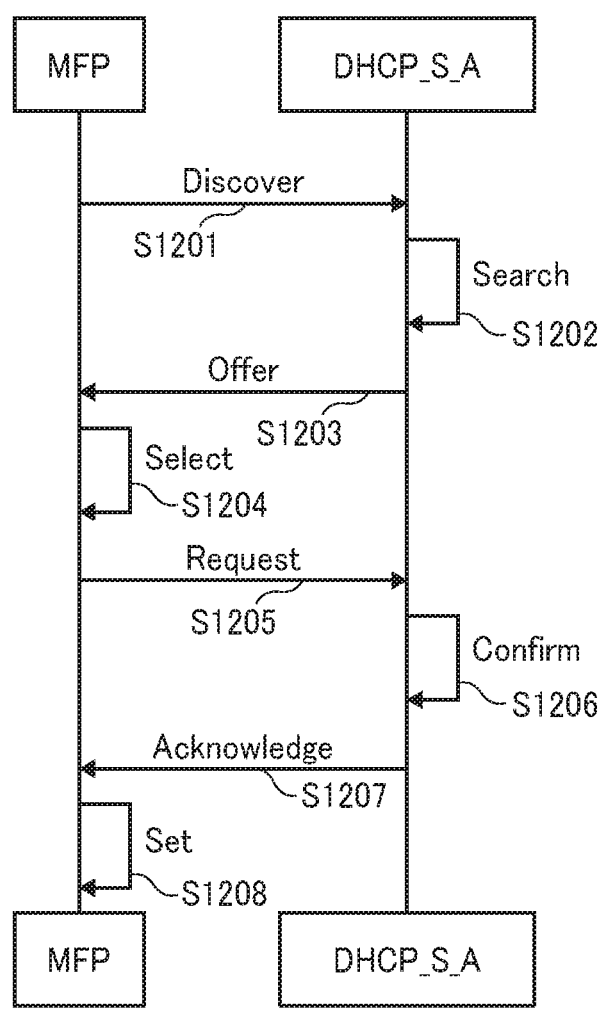
FIG. 12 is a sequence diagram illustrating an operation of an ordinary DHCP processing, according to the related art.

FIG. 12 is a sequence diagram illustrating an operation of an ordinary DHCP processing (according to the related art). When a Discover packet is sent to a network by broadcast from the MFP (S1201), a DHCP server that has received this broadcast selects an IP address that can be assigned (S1202) and transmits an Offer packet to provide to the MFP (S1203). When multiple offers are provided, the MFP selects one of the offers (S1204) and transmits a Request packet, which is an IP address assignment request packet (S1205). Upon receiving the Request packet, the DHCP server fixes the assignment and sends to the MFP (S1207) an Acknowledge packet (hereinafter referred to as "Ack packet"), which is a response packet. By using a network setting described in this Ack packet, the MFP 120 changes a network setting of the MFP 120 itself (S1208).

Figure 13:
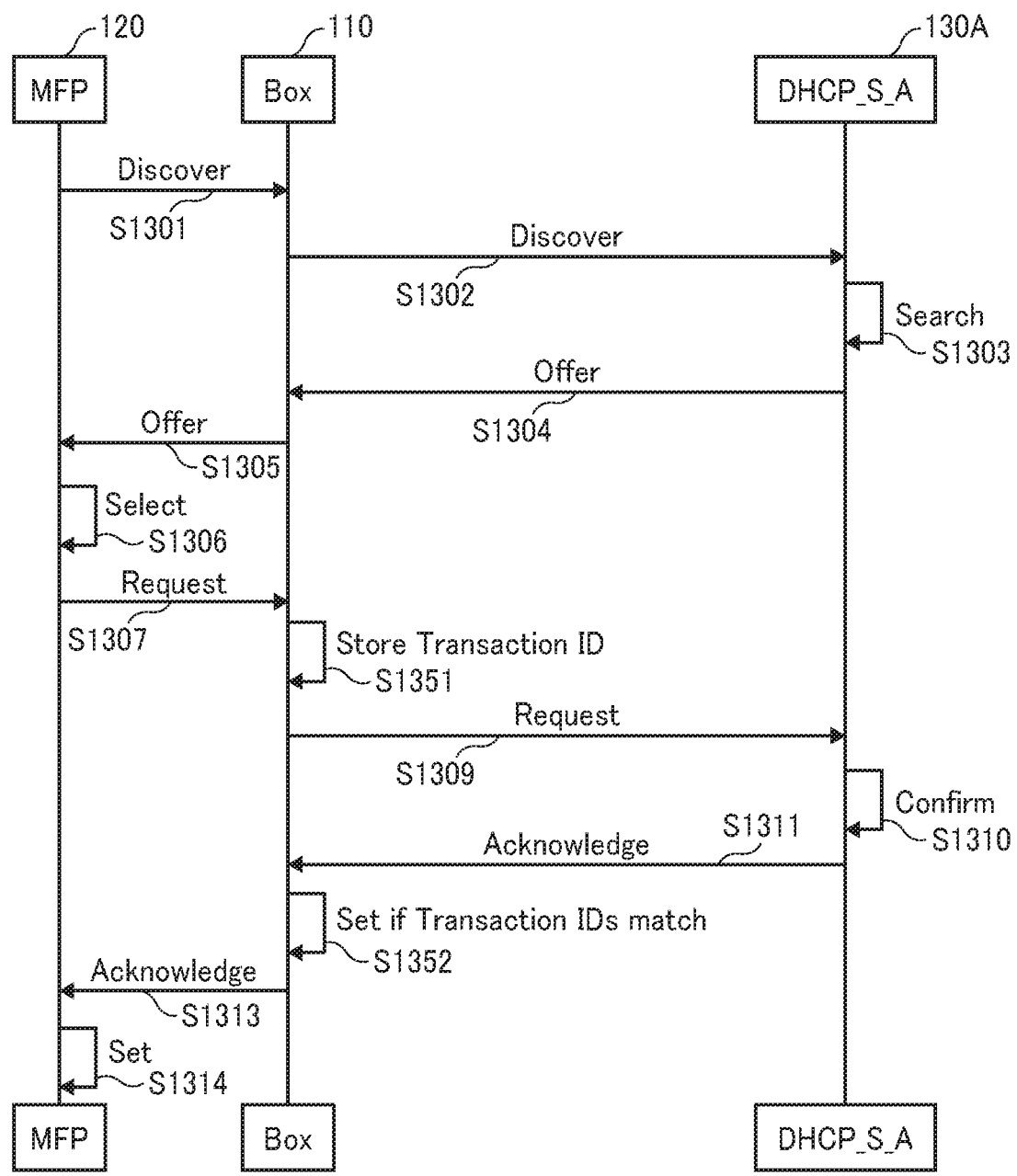
FIG. 13 is a diagram illustrating a sequence of allocating a new IP address by the DHCP, according to an embodiment of the present disclosure.

FIG. 13 illustrates a sequence of allocating a new IP address by the DHCP according to the present embodiment. The sequence of FIG. 13 illustrates a sequence when the interface box 110 is provided between the MFP 120 and the DHCP server 130A. The MFP 120 and the DHCP server 130A operate in the same manner as that in a conventional DHCP sequence, and the interface box 110 receives the DHCP packet and transfers the DHCP packet to another party (S1301 to S1314).

In the present embodiment, the DHCP processing unit 720 in the interface box 110 analyzes a passing DHCP packet and detects network setting content. Information for identifying a transaction (hereinafter, Transaction ID) is given to the DHCP packet, and thus the DHCP processing unit 720 determines whether a Transaction ID of the DHCP packet transmitted from the MFP 120 and a Transaction ID of the DHCP packet transmitted from the DHCP server 130A are the same. In the present embodiment, when receiving the Request packet from the MFP 120, the DHCP processing unit 720 acquires the Transaction ID from the packet and temporarily stores the Transaction ID (S1351). Then, when receiving the Ack packet from the DHCP server 130A, the DHCP processing unit 720 acquires the Transaction ID from the packet and compares the Transaction ID with the temporarily stored Transaction ID. When these Transaction IDs match, the DHCP processing unit 720 extracts the network setting content in the Ack packet and stores the extracted network setting content in the communication control information storage unit 740 (S1352). The content of the network setting to be extracted is the information of the IP address, subnet mask and default gateway assigned to the MFP 120. In another example, the DHCP server 130A distributes supplementary information such as the IP address of a DNS server, and the MFP 120 may store this supplementary information.

The DHCP processing unit 720 determines whether the Transaction ID of the DHCP packet transmitted from the MFP 120 and the Transaction ID of the DHCP packet received from the DHCP server 130A match. Therefore, there is no worry of misidentifying transactions. In addition, when the interface box 110 per se acquires the network setting by the DHCP, the Transaction IDs may overlap. In the present embodiment, after performing the DHCP processing of the interface box 110 itself, the DHCP processing of the MFP 120 is performed. By providing a time difference in this manner, even when the Transaction IDs overlap, there is no misidentifying transactions. In addition, after detecting the Transaction ID from the MFP 120, the interface box 110 performs the DHCP processing by using another Transaction ID, and the DHCP processing of the MFP 120 and the DHCP processing of the interface box 110 thereby can be concurrently executed.

Figure 14:
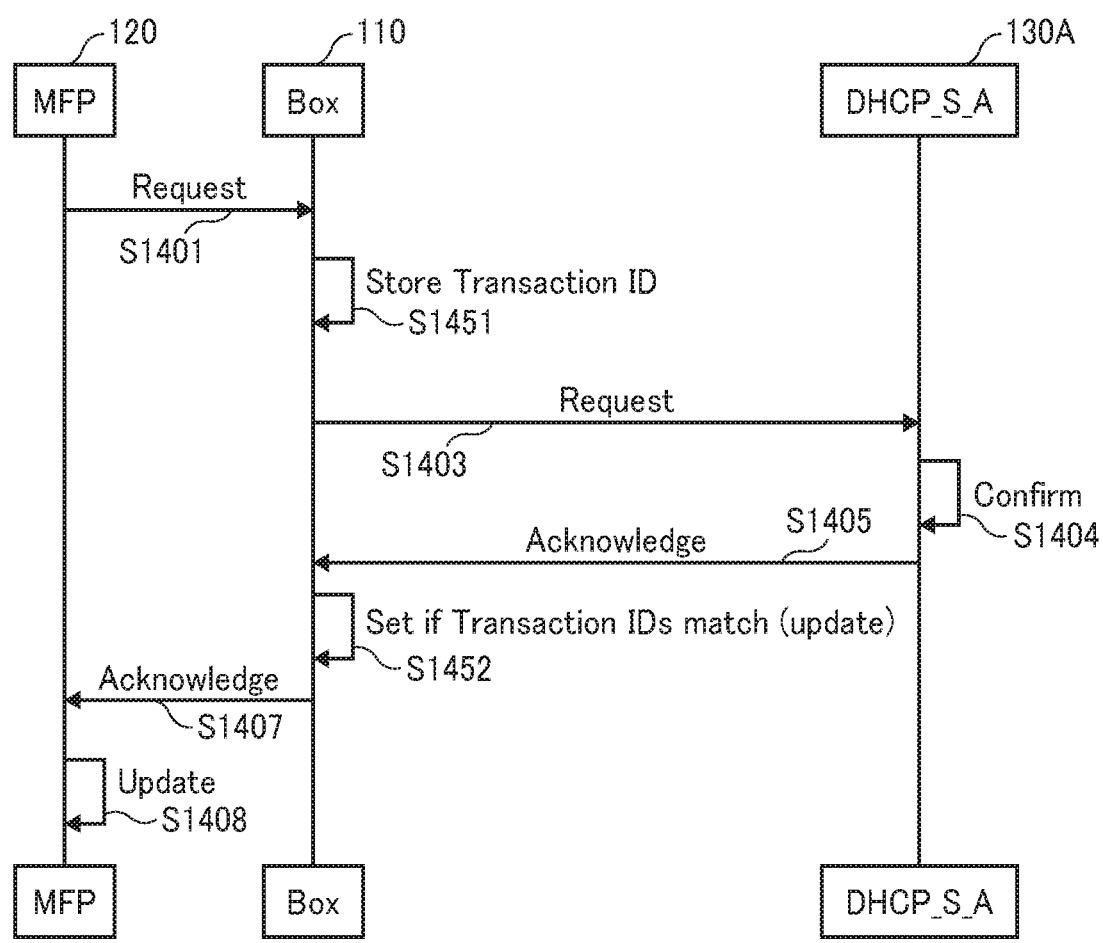
FIG. 14 is a diagram illustrating a sequence of updating an IP address by the DHCP, according to an embodiment of the present disclosure.

FIG. 14 is a diagram illustrating a sequence of updating an IP address by the DHCP of the present embodiment. The sequence is for updating network setting (continuing use or switching to another network setting) in the middle of a DHCP lease time limit. Even in the sequence illustrated in FIG. 14, the MFP 120 and the DHCP server 130A operate in the same manner as that in a conventional DHCP update sequence. In addition, the interface box 110 receives and transfers each DHCP packet to the other party. That is, the MFP 120 transmits the Request packet to the DHCP server 130A (S1401 and S1403). Upon receiving this packet, the DHCP server 130A returns the Ack packet including the network setting that has been assigned (S1405 and S1407). The MFP 120 performs update processing with a received value (S1408).

When transferring a received Request packet, the DHCP processing unit 720 of the interface box 110 extracts and temporarily stores a Transaction ID (S1451). Then, the DHCP processing unit 720 extracts the transaction ID from the Ack packet returned from the DHCP server 130A and determines whether the Transaction ID matches the temporarily stored Transaction ID (S1452). When these Transaction IDs match, the DHCP processing unit 720 updates a value stored in the communication control information storage unit 740 with a network setting value given to the Ack packet.

Figure 15:
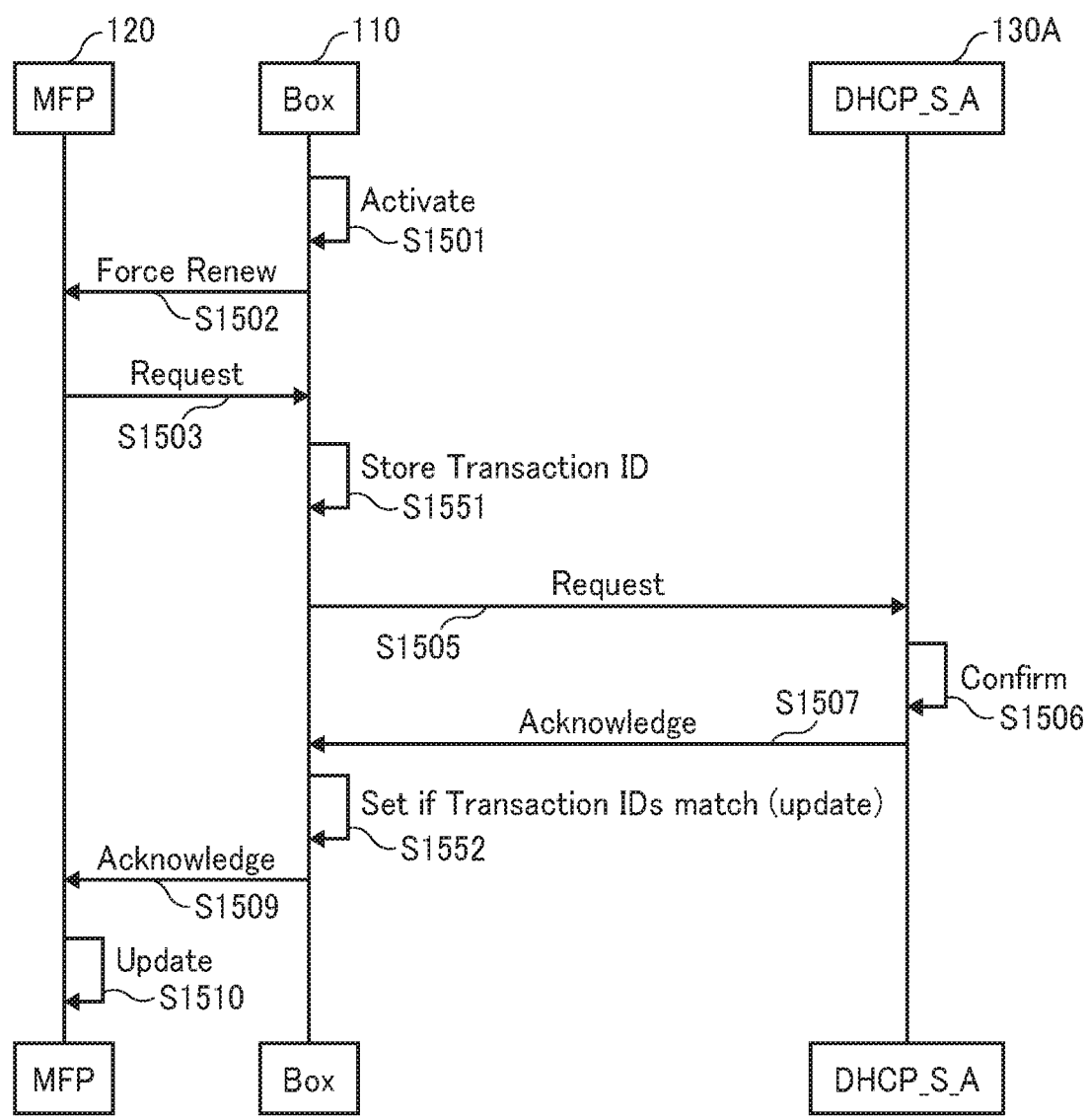
FIG. 15 is a diagram illustrating a sequence when the interface box is activated, according to an embodiment of the present disclosure.

FIG. 15 is a diagram illustrating a sequence when the interface box 110 is activated. When the MFP 120 has already received the network setting by the DHCP at a time of activating the interface box 110 (S1501), the interface box enters a state not knowing the network setting of the MFP 120. In order to solve this problem, the DHCP processing unit 720 of the interface box 110 analyzes communication from the transmitting/receiving unit 510M, finds a transmission source address, and detects the IP address of the MFP 120, The DHCP processing unit 720 sends a DHCP Force Renew (RFC 3203) to the detected IP address (S1502). With this, the MFP 120 acquires the network setting again in a same manner as that in the abovementioned FIG. 14 (S1503 to S1510). The DHCP processing unit 720 compares the Transaction ID of the communication in the same manner as that in the abovementioned FIG. 14 to detect the network setting of the MFP 120, and stores the network setting in the communication control information storage unit 740 (S1551 and S1552).

Figure 16:
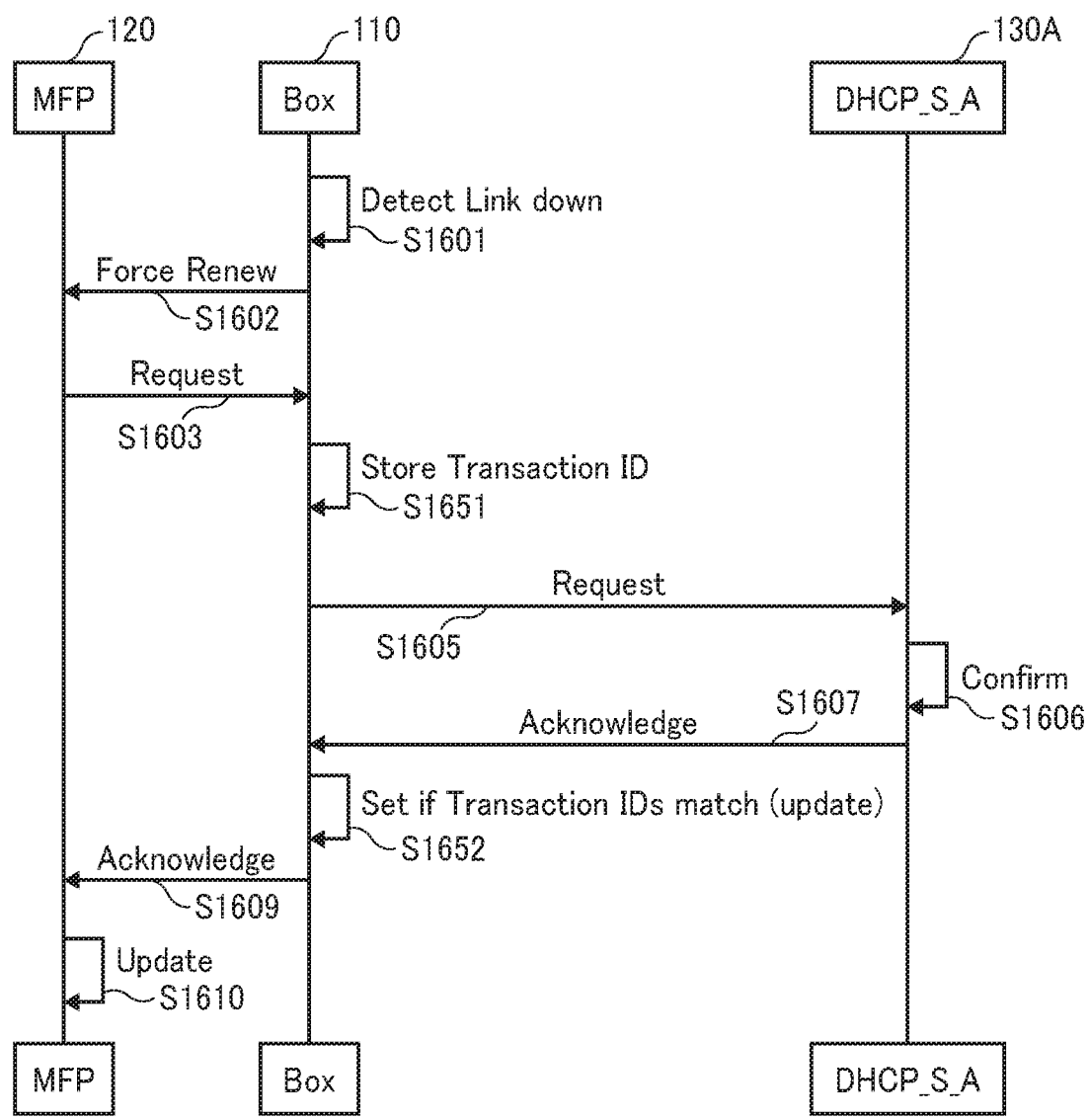
FIG. 16 is a diagram illustrating a sequence when link down of the interface box is restored, according to an embodiment of the present disclosure.

FIG. 16 is a diagram illustrating a sequence of the DHCP when link down occurs and then is restored and links up. As a case of the link down, there are a case where the MFP 120 is exchanged for another MFP by replacement, a case where the MFP 120 is connected to another network from the Net_A, and the like in addition to a trouble of a cable. Therefore, in the present embodiment, the DHCP processing unit 720 becomes a link down (S1601), and then when linking up, transmits the Force Renew packet to the NEP in the same manner as that at the time of activation in such a manner that the DHCP processing is performed again (S1602). Subsequent steps S1603 to S1610, S1651, and S1652 are the same as the processing described with reference to FIG. 15, and thus description thereof will be omitted.

Figure 17:
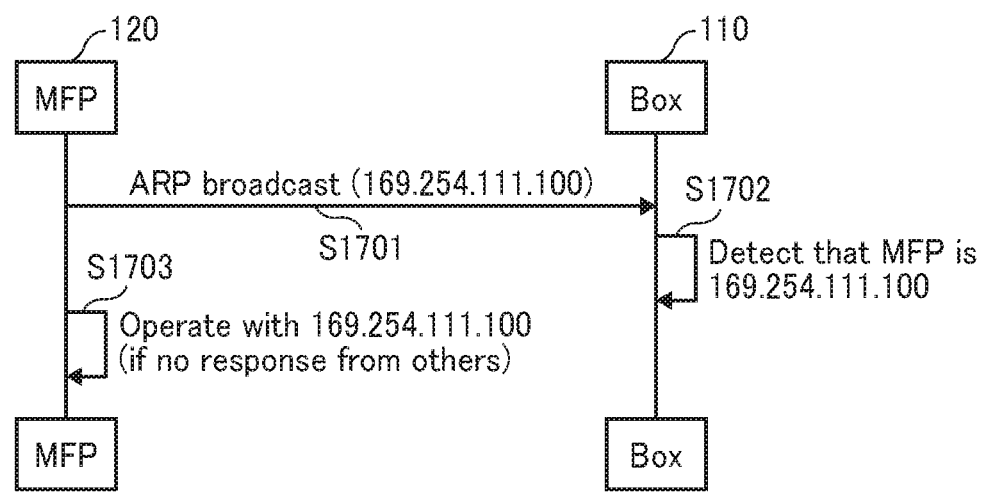
FIG. 17 is a sequence diagram illustrating an address detection operation of a multifunction peripheral (MFP) by using the AutoNet function, according to an embodiment of the present disclosure.

FIG. 17 is a sequence diagram illustrating an address detection operation of the MFP 120 in a case of AutoNet (RFC3927), which is a sequence when the IP address of the MFP 120 is set by AutoNet instead of the DHCP. In response to ARP broadcast from the transmitting/receiving unit 510M (S1701), the DHCP processing unit 720 of the interface box 110 extracts an address of a transmission source from a broadcast packet. Then, the DHCP processing unit 720 recognizes the extracted data as the IP address of the MFP 120 and stores the IP address in the communication control information storage unit 740 (S1702). When there is no response from the other, the MFP 120 that has transmitted the ARP broadcast sets the IP address as an own IP address and performs communication (S1703).

Figure 18:
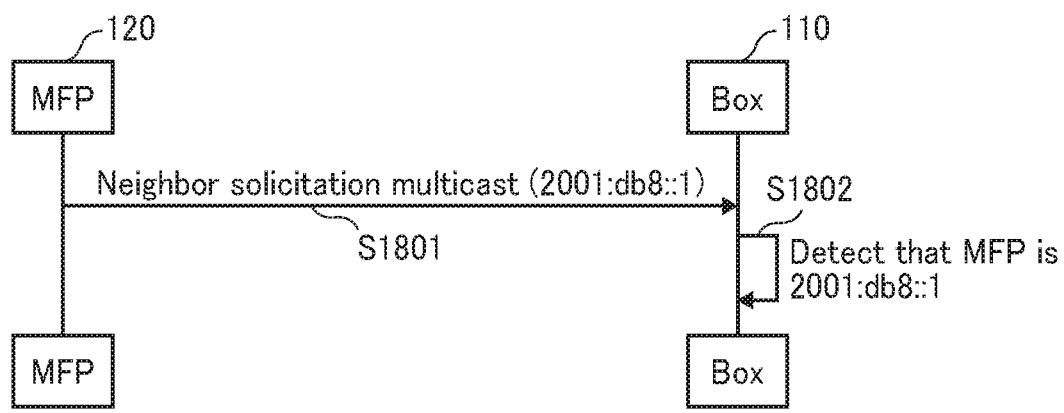
FIG. 18 is a sequence diagram of performing network setting configuration by using the IPv6 neighbor discovery, according to an embodiment of the present disclosure.

FIG. 18 is a sequence when network setting such as an IP address is performed by IPv6 neighbor discovery (RFC 4861, Neighbor solicitation) instead of the DHCP. When receiving a neighbor discovery packet from the transmitting/receiving unit 510M (S1801), the DHCP processing unit 720 extracts a transmission source IP address (IPv6 address) from the packet. Then, the interface box 110 stores this packet in the communication control information storage unit 740 as the IP address of the MFP 120 (S1802).

In the above description, an implementation example in which the interface box 110 snoops the DHCP packet and stores the network setting of the MFP 120 in the MFP 120 itself has been described. Hereinafter, a description is given of how other device not knowing the IP address of the MFP 120 (hereinafter referred to as a "real IP address") that is assigned from the DHCP server communicates with the MFP 120. In addition, in the following example, a description is given assuming a case where the PC 140B in the Net_B segment not knowing the real IP address of the MFP 120 inputs a print job to the MFP 120.

First Application Example

Figure 19:
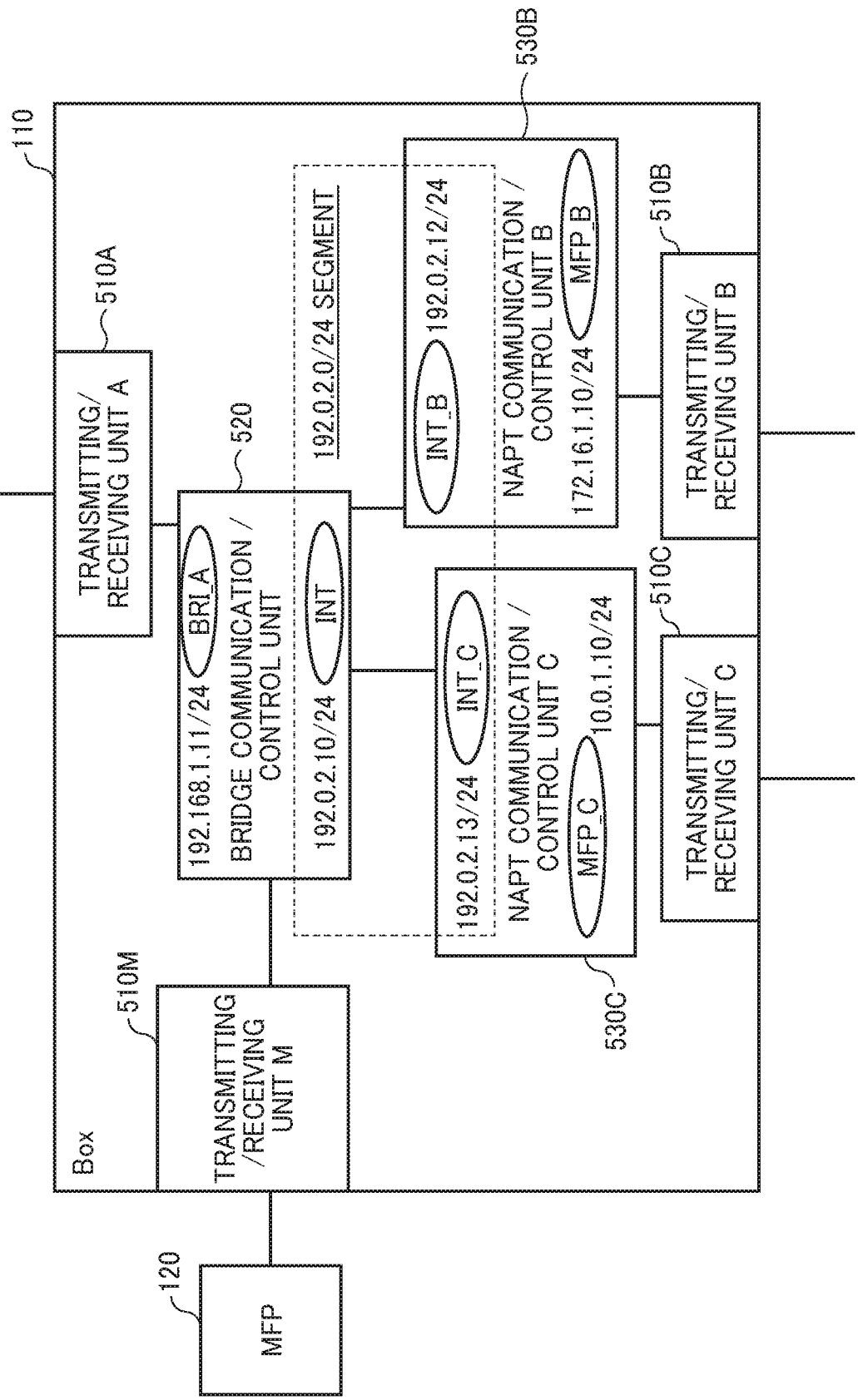
FIG. 19 is a diagram illustrating an example of an IP address architecture of a first application example.

FIG. 19 is a diagram illustrating an example of an IP address architecture set in the interface box 110. In the interface box 110, an internal local segment for the bridge communication/control unit 520 and the NAPT communication/control units 530B and 530C to communicate with each other is provided. In the example of FIG. 19, 192.0.2.0/24 is provided as the internal local segment. In addition, the bridge communication/control unit 520, the NAPT communication/control units 530B and 530C are provided with IP addresses for the internal local segment, respectively.

In the example of FIG. 19, 192.168.1.11/24 (this IP address is referred to as "BRI_A") which is an IP address assigned by the DHCP server 130A is set in the bridge communication/control unit 520. In the bridge communication/control unit 520, 192.0.2.10/24 (this IP address is referred to as "INT") is set as the IP address for the internal local segment.

In the NAPT communication/control unit 530B, 192.0.2.12/24 (this IP address is referred to as "INT_B") is set as the IP address for the internal local segment. In the NAPT communication/control unit 530C, 192.0.2.13/24 (this IP address is referred to as "INT_C") is set as the IP address for the internal local segment.

In addition, the NAPT communication/control unit 530B is provided with an IP address for accessing the MFP 120 from the Net_B segment. In the example of FIG. 19, 172.16.1.10/24 (this IP address is referred to as "MFP_B") is provided as an IP address for an access to the MFP 120. Further, in the PC 140B in the Net_B segment, the IP address of this MFP_B is registered as the IP address of the MFP 120. When receiving the ARP request for searching the MFP_B, the NAPT communication/control unit 530B responds to this request by proxy.

Similarly, the NAPT communication/control unit 530C is provided with an IP address for accessing the MFP 120 from the Net_C segment, and in the example of FIG. 19, 10.0.1.10/24 (this IP address is referred to as "MFP_C") is provided. In addition, in the PC 140C in the Net_C segment, the MFP_C is registered as the IP address of the MFP 120. Upon receiving the ARP request for the MFP_C, the NAPT communication/control unit 530C responds to this request by proxy.

Figure 20:
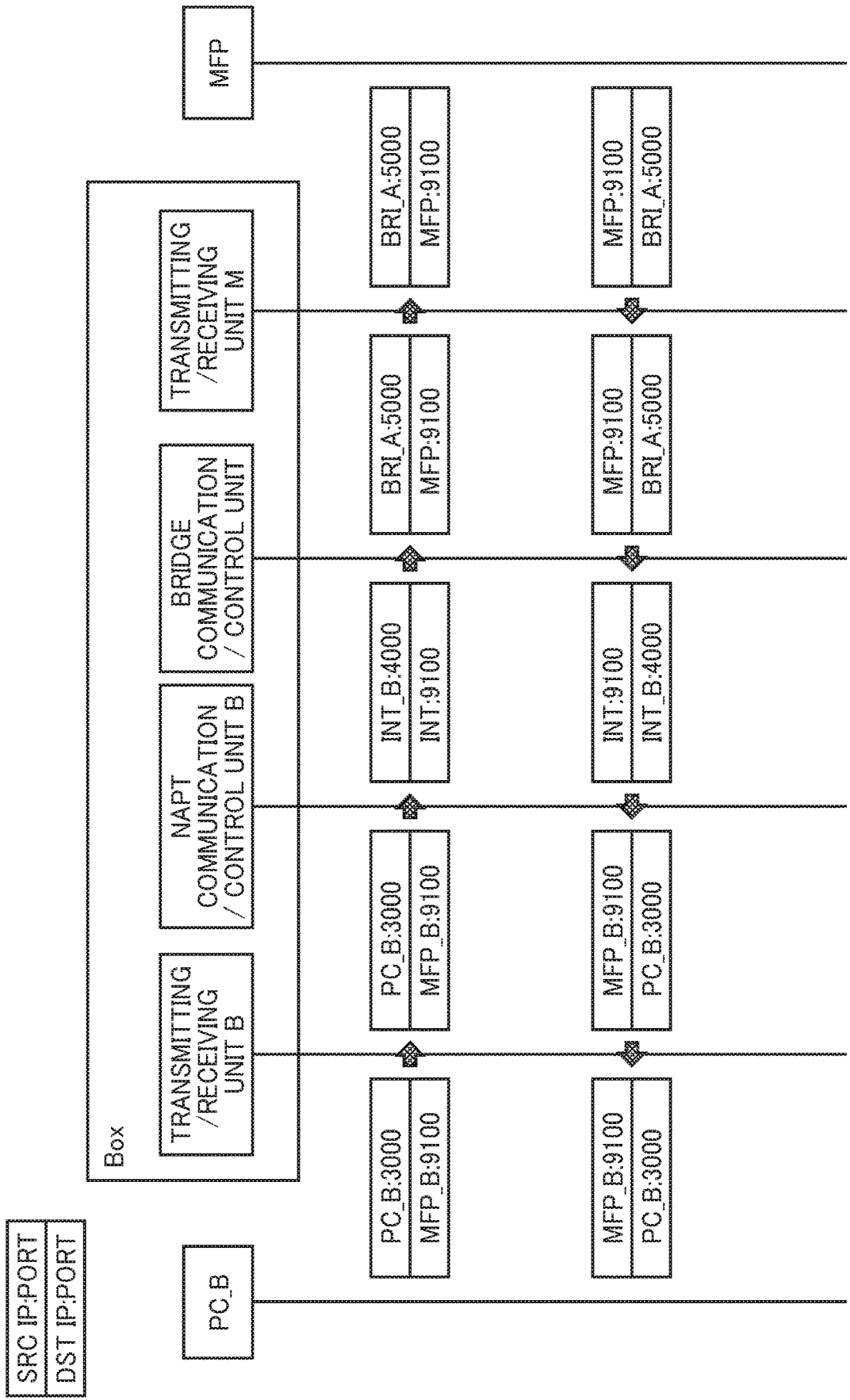
FIG. 20 is a diagram illustrating transition of address translation of the first application example.

Based on the example of the abovementioned FIG. 19, an example of transition of address translation is illustrated in FIG. 20. The FIG. 20 illustrates an outbound packet and an inbound packet when a print job is input from the PC 140B (PC_B) as a transmission source to the MFP 120 as a destination. In addition, an IP address and a port number of the transmission source are written in an upper part of a frame before and after an arrow, and an IP address and a port number of the destination are written in a lower part in the frame. NAPT translation processing is performed at places where these values change before and after the arrow.

Hereinafter, a processing of translating the IP address and port number of a transmission source is referred to as "source NAT". In addition, a processing of translating the IP address and port number of a destination is referred to as "destination NAT". In the following description, while translation of an IP address is mentioned, translation of a port number is also appropriately performed.

In the example of FIG. 20, the NAPT communication/control unit 530B performs the source NAT and destination NAT on a transmission packet from PC 140B (PC_B 1). The NAPT communication/control unit 530B receives a packet in which the IP address (e.g. 172.16.1.100, represented by "PC_B" in the figure) of the PC 140B is set as the source IP address and the MFP_B (e.g., 172.16.1.10) is specified as the destination IP address. The NAPT communication/control unit 530B performs address translation on this packet with the INT_B (192.0.2.12) as the transmission source and the INT (192.0.2.10) as the destination. In this process, the IP address and the port number before and after the translation are mapped and registered in the NAPT table storage unit 850B.

Then, the bridge communication/control unit 520 receives the abovementioned translated packet and further performs the source NAT and destination NAT. The bridge communication/control unit 520 receives the packet in which the transmission source is the INT_B (192.0.2.12) and the destination is the INT (192.0.2.10), and performs address translation on this packet with the BRI_A (192.168.1.11) as the transmission source and the real IP address (represented by "MFP" in the figure. e.g., 192.168.1.10) assigned to the MFP as the destination. This address translation processing is performed by the communication unit 710 (see FIG. 7), and the real IP address (192.168.1.10) of the MFP 120 acquired by the DHCP processing unit 720 and stored in the communication control information storage unit 740 is used as the destination IP address after the translation. The IP address and the port number before and after the translation are mapped and registered in the NAPT table storage unit 750.

With this, the MFP 120 receives a packet in which the transmission source is the BRI_A (192.168.1.11) and the destination is the real IP address of the MFP 120 itself (192.168.1.10). That is, the MFP 120 receives a packet in which the interface box 110 is the transmission source.

Regarding the inbound packet, an operation for restoring the address-translated packet to an original state is performed. The MFP 120 reverses the source IP address and the destination IP address of the abovementioned received packet and transmits a reply packet. Based on a mapping relationship stored in the NAPT table storage unit 750, the bridge communication/control unit 520 transmits to the NAPT communication/control unit 530B a packet in which the transmission source is the INT and the destination is the INT_B. Based on a mapping relationship stored in the NAPT table storage unit 850B, the NAPT communication/control unit 530B transmits to the PC 140B (PC_B 1) a packet in which the transmission source is the MFP_B and the destination is the PC_B. Since the PC 140B has received a packet in which the source IP address and the destination IP address of the packet transmitted by the PC 140B per se have been reversed, the PC 140B does not discard but allows the packet.

With this, even if a PC provided in a segment different from that of the MFP 120 does not know a current actual IP address (IP address assigned by DHCP) of the MFP 120, the PC can correctly transmit data to the MFP 120. In addition, the PC that has transmitted the packet can correctly receive the returned reply packet.

Second Application Example

Figure 21:
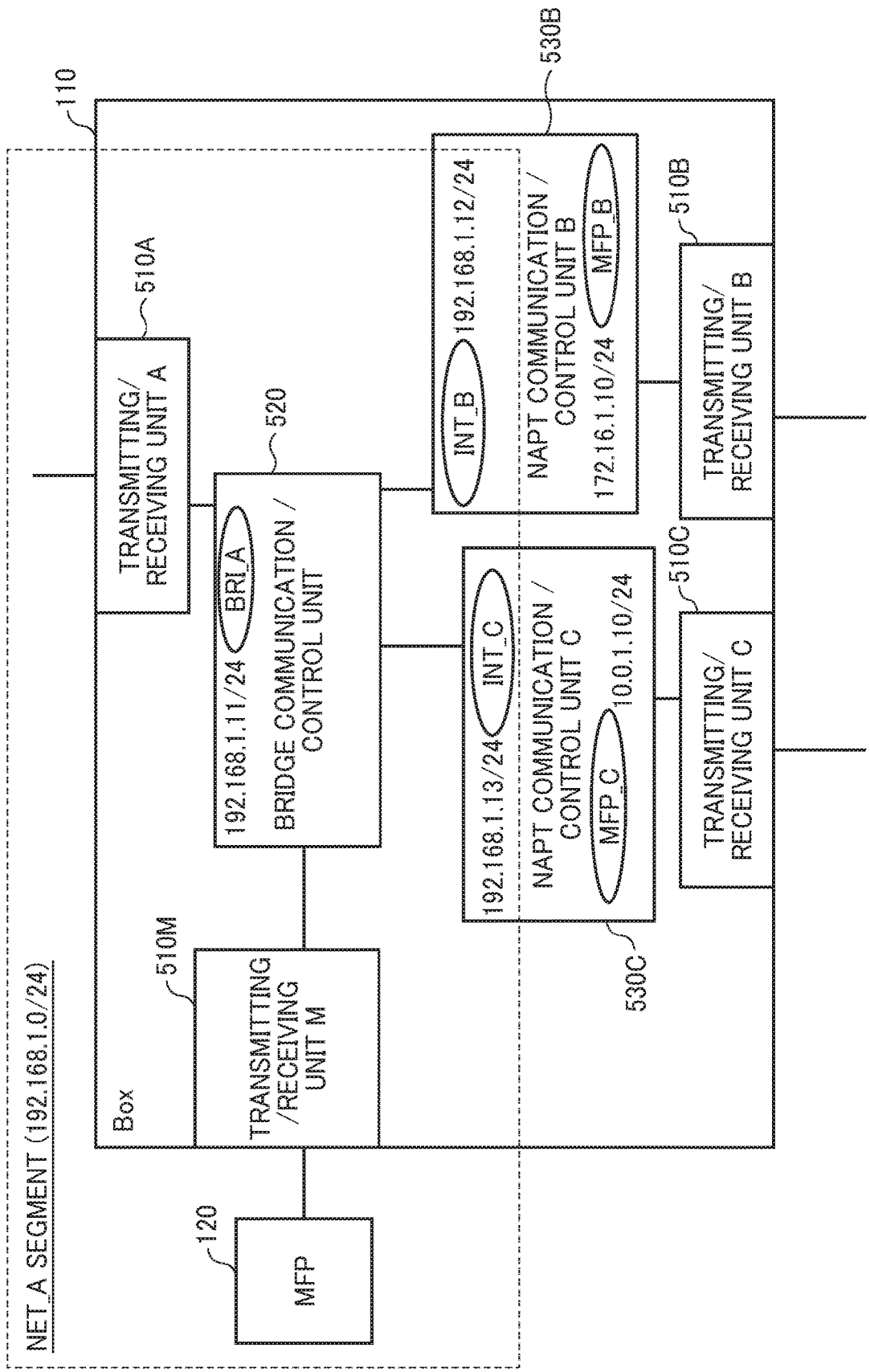
FIG. 21 is a diagram illustrating an IP address architecture of a second application example.

In a second application example, an implementation example in which the internal local segment is not provided and the NAPT communication/control units 530B and 530C are contained in the Net_A will be described. FIG. 21 is a diagram illustrating an IP address architecture of the interface box 110 in the second application example.

In the NAPT communication/control units 530B and 530C, 192.168.1.12/24 (this IP address is referred to as "INT_B"), 192.168.1.13/24 (this IP address is referred to as "INT_C") are respectively set for the Net_A segment. Addresses assigned by the DHCP server 130A may be used for these IP addresses.

As is the case with the first application example, the MFP_B and MFP_C for accessing the FP 120 are registered in the NAPT communication/control units 530B and 530C.

Figure 22:
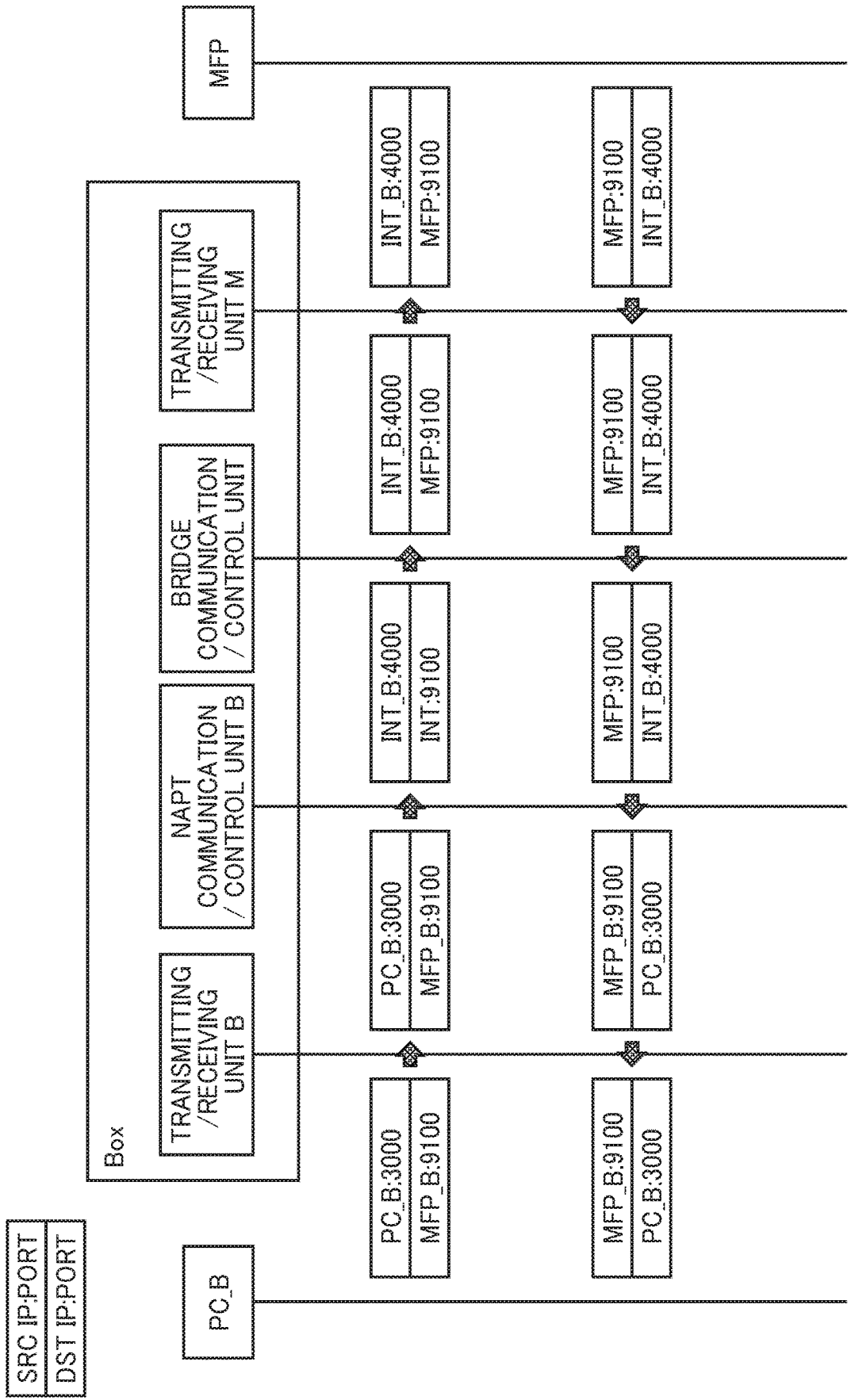
FIG. 22 is a diagram illustrating transition of address translation of the second application example.

Based on the example of the abovementioned FIG. 21, an example of transition of address translation in the second application example is illustrated in FIG. 22. The example of FIG. 22 also illustrates an outbound packet and an inbound packet when a print job is input from the PC 140B (PC_B) that is a transmission source to the MFP 120 that is a destination.

In the example of FIG. 22, the NAPT communication/control unit 530B performs the source NAT and destination NAT on a transmission packet from PC 140B (PC_B 1). The NAPT communication/control unit 530B receives a packet in which the transmission source is the PC_B (assumed to be 172.16.1.100) and the destination is the MFP_B (172.16.1.10), and performs address translation with the INT_B (192.168.1.12) as the transmission source and the MFP (192.168.1.10) as the destination. This address translation processing is performed by the communication unit 810B of the NAPT communication/control unit 530B. In addition, the NAPT communication/control unit 530B acquires the real IP address (192.168.1.10) of the MFP 120 stored in the communication control information storage unit 740 of the bridge communication/control unit 520, and uses the address for the destination after the translation.

In the second application example, the bridge communication/control unit 520 performs bridge transfer to the MFP 120 without performing address translation processing. As a result, the MFP 120 receives a packet in which the transmission source is the INT_B (192.168.1.12) and the destination is the real IP address of the MFP 120 itself (192.168.1.10).

Regarding the inbound packet, an operation for restoring the address-translated packet to an original state is performed. The NAPT communication/control unit 530B receives from the MFP 120 a reply packet in which the transmission source IP address is the MFP and the destination IP address is the INT_B, performs address translation in such a manner that the source is the MFP_B and the destination is the PC_B, and transmits the packet to the PC 140B (PC_B1). Since the PC 140B has received a packet in which the source IP address and the destination IP address of the packet transmitted by the PC 140B per se have been reversed, the PC 140B does not discard but allows the packet.

Even in the second application example, even if a PC provided in a segment different from that of the MFP 120 does not know a current actual IP address (IP address assigned by DHCP) of the MFP 120, the PC can correctly transmit data to the MFP 120. In addition, the PC that has transmitted the packet can also correctly receive the inbound reply packet.

Although a description is given heretofore of the access from the Net_B segment which is a segment different from that of the MFP 120, data are transmitted and received to and from the Net_C in the same or substantially the same manner.

In the above, a description is given of an example in which the interface box 110 illustrated is separated from the MFP 120. In another example, the interface box 110 is incorporated in the MFP 120 and provided in a same housing.

In the above description, specific numerical values such as an IP address are merely examples, and the present disclosure is not limited thereto. In addition, although in the present embodiment, a description is given of an example in which the interface box 110, which is a network device, is an example of the information processing apparatus, the information processing apparatus can be a computer such as a PC, a server, or an image forming device such as an MFP.

A storage unit corresponds to the communication control information storage units 740, 840B, and 840C. A first transmitting/receiving unit corresponds to the transmitting/receiving unit 510B and the transmitting/receiving unit 510C. In the first application example, an address translation unit corresponds to a configuration including the bridge communication/control unit 520, the NAPT communication/control units 530B and 530C, and in the second application example, the address translation unit corresponds to the NAPT communication/control units 530B and 530C. A second transmitting/receiving unit corresponds to the transmitting/receiving unit 510M. A processing unit corresponds to the DHCP processing units 720, 830B, and 830C. In addition, the information processing apparatus corresponds to the interface box 110 or a device including the interface box 110. The first device corresponds to the MFP 120, but other servers or the like can be the first device.

The first network segment corresponds to the Net_A, and the second network segment corresponds to the Net_B or Net_C. A transaction identification information corresponds to the Transaction ID, In addition, an IP address assignment request packet corresponds to the Request packet in the DHCP sequence, and a response packet corresponds to the Ack packet in the DHCP sequence.

The first IP address corresponds to the IP address assigned by the DHCP server or the MFP itself, and the second IP address corresponds to the IP address of the MFP_B.

As described above, even a device that does not recognize an actual IP address of the MFP communicates with the MFP and, from each of a plurality of network segments, access control is performed for a device to which an IP address is assigned by the DHCP server.

According to an embodiment of the present disclosure, access control from each of a plurality of network segments to a device to which an IP address is dynamically assigned is implemented.

The above-described embodiments are illustrative and do not limit the present disclosure, Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus, between a first device and a network server, for relaying a packet between a bridge network segment and a packet transfer network segment, which is a segment different from the bridge network segment, the information processing apparatus comprising:
   a memory configured to store a plurality of instructions which, when executed by one or more processors, cause the one or more processors to:
   store, in the memory, a first IP address dynamically assigned by the network server or the first device to the first device provided in the bridge network segment and store a second IP address corresponding to an IP address of the first device, which is for communicating with the first device and is in accordance with an address architecture of the packet transfer segment;

receive a packet that is transmitted from the packet transfer segment and addressed to the second IP address;

compare transaction identification information of the received packet from the second network segment with the transaction identification information of the stored second IP address in the first network segment; upon determining a match exist between the transaction identifications information;

convert a destination IP address of the packet received by the one or more processors from the second IP address into the first IP address stored in the memory;

convert a transmission source IP address of the packet received by the one or more processors into an IP address assigned as an own IP address in accordance with an address architecture of the bridge network segment; and transmit, to the first device, the packet having the destination IP address and the transmission source IP address each of which is converted by the one or more processors.

2. The information processing apparatus according to claim 1,
wherein the one or more processors are further caused to:
receive a packet including the first IP address dynamically assigned as an IP address of the first device;
acquire the first IP address from the packet; and
store the first IP address in the memory.

3. The information processing apparatus according to claim 2,
wherein the one or more processors are further caused to acquire the first IP address from a DHCP packet exchanged between the first device and a DHCP server.

4. The information processing apparatus according to claim 3,
wherein the one or more processors are further caused to:
acquire transaction identification information from an IP address assignment request packet transmitted from the first device;
acquire transaction identification information from a response packet for the IP address assignment request packet transmitted from the DHCP server; and acquire the first IP address included in the response packet when the transaction identification information acquired from the IP address assignment request packet matches the transaction identification information acquired from the response packet.

5. The information processing apparatus according to claim 1, wherein the first device is a multifunction printer.

6. A packet relay method for relaying a packet exchanged between a bridge network segment and a packet transfer network segment, which is a segment different from the bridge network segment, performed by an information processing apparatus connected to the bridge network segment and the packet transfer segment, the packet relay method comprising:

storing a first IP address dynamically assigned to a first device provided in the bridge network segment;

storing a second IP address, which is for communicating with the first device and is in accordance with an address architecture of the packet transfer network segment;

receiving a packet that is transmitted from the packet transfer network segment and addressed to the second IP address;

comparing transaction identification information of the received packet from the second network segment with the transaction identification information of the stored second IP address in the first network segment; upon determining a match exist between the transaction identifications information;

converting a destination IP address of the received packet from the second IP address into the stored first IP address, and converting a transmission source IP address of the received packet into an IP address assigned as an own IP address in accordance an address architecture of the bridge network segment; and transmitting, to the first device, the packet having the destination IP address and the transmission source IP address each of which is converted by the information processing apparatus.

7. The packet relay method according to claim 6, wherein the first device is a multifunction printer.

* * * * *